United States Patent
Mellqvist (12)

(10) Patent No.: US 10,856,105 B2
(45) Date of Patent: Dec. 1, 2020

(54) METHODS AND DEVICES FOR COMMUNICATION BASED ON IMAGE RECOGNITION IN A WIRELESS COMMUNICATION SYSTEM

(71) Applicant: SONY CORPORATION, Tokyo (JP)

(72) Inventor: Anders Mellqvist, Malmo (SE)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/611,074

(22) PCT Filed: Aug. 25, 2017

(86) PCT No.: PCT/US2017/048545
§ 371 (c)(1),
(2) Date: Nov. 5, 2019

(87) PCT Pub. No.: WO2019/040077
PCT Pub. Date: Feb. 28, 2019

(65) Prior Publication Data
US 2020/0169833 A1 May 28, 2020

(51) Int. Cl.
*H04W 4/021* (2018.01)
*H04W 4/029* (2018.01)
(Continued)

(52) U.S. Cl.
CPC ........ *H04W 4/021* (2013.01); *G06K 9/00221* (2013.01); *H04W 4/023* (2013.01); *H04W 4/025* (2013.01); *H04W 4/029* (2018.02); *H04W 16/28* (2013.01); *H04W 48/16* (2013.01); *H04W 64/003* (2013.01)

(58) Field of Classification Search
CPC ..... H04W 4/021; H04W 4/029; H04W 4/023; H04W 4/025; H04W 16/28; H04W 48/16; H04W 64/003; H04W 64/00; H04W 4/02; G06K 9/00221
See application file for complete search history.

(56) References Cited

U.S. PATENT DOCUMENTS

2005/0070247 A1 3/2005 Larson et al.
2010/0248726 A1* 9/2010 Kagimoto ............. H04W 36/02
455/437
(Continued)

FOREIGN PATENT DOCUMENTS

CN 105993157 A 10/2016

OTHER PUBLICATIONS

International Search Report and Written Opinion of the International Searching Authority, PCT/US2017/048545, dated Mar. 23, 2018, 16 pages.
(Continued)

*Primary Examiner* — Marisol Figueroa
(74) *Attorney, Agent, or Firm* — Myers Bigel, P.A.

(57) ABSTRACT

A wireless electronic device (1900) used in a wireless communication system is described. The wireless electronic device performs operations including detecting a person in a geographical area serviced by a base station and communicating with the UE responsive to the detecting the person in the geographical area serviced by the base station. The UE is associated with the person in the geographical area serviced by the base station. Related methods are disclosed.

17 Claims, 10 Drawing Sheets

(51) Int. Cl.
*G06K 9/00* (2006.01)
*H04W 4/02* (2018.01)
*H04W 16/28* (2009.01)
*H04W 64/00* (2009.01)
*H04W 48/16* (2009.01)

(56) References Cited

U.S. PATENT DOCUMENTS

| | | |
|---|---|---|
| 2011/0134240 A1 | 6/2011 | Anderson et al. |
| 2017/0064609 A1 | 3/2017 | Park et al. |
| 2018/0023956 A1* | 1/2018 | Chen ..................... G01S 17/88 |
| | | 701/524 |
| 2018/0164103 A1* | 6/2018 | Hill ........................ G01S 5/02 |
| 2020/0169702 A1* | 5/2020 | Hallett ................. H04W 4/023 |

OTHER PUBLICATIONS

"First Office Action and English language translation", CN Application No. 201780093100.5, dated Sep. 3, 2020, 22 pp.

* cited by examiner

DETERMINING THAT THE PERSON DOES NOT HAVE A REGISTERED UE ASSOCIATED WITH THE PERSON — 910

FIG. 9

DETERMINING THAT THE PERSON IS LEAVING THE GEOGRAPHIC AREA SERVICED BY THE FIRST BASE STATION — 1010

PERFORMING A HANDOVER TO A SECOND BASE STATION THAT IS DIFFERENT FROM THE FIRST BASE STATION, IN RESPONSE TO THE DETERMINING THAT THE PERSON IS LEAVING THE GEOGRAPHIC AREA SERVICED BY THE FIRST BASE STATION — 1020

FIG. 10

DETERMINING THAT THE PERSON IS LEAVING THE GEOGRAPHIC AREA SERVICED BY THE FIRST BASE STATION — 1010

PERFORMING IMAGE RECOGNITION TO RECOGNIZE THE PERSON LOCATED IN THE GEOGRAPHIC AREA SERVICED BY THE BASE STATION — 1110

DETERMINING A DIRECTION OF MOVEMENT, ANGLE OF MOVEMENT, AND/OR A SPEED OF THE PERSON THAT WAS RECOGNIZED — 1120

EXTRAPOLATING THAT THE PERSON IS LEAVING THE GEOGRAPHIC AREA SERVICED BY THE FIRST BASE STATION BASED ON THE IMAGE RECOGNITION AND THE DETERMINING THE DIRECTION OF MOVEMENT, ANGLE OF MOVEMENT AND/OR THE SPEED OF THE PERSON — 1130

FIG. 11

METHODS AND DEVICES FOR COMMUNICATION BASED ON IMAGE RECOGNITION IN A WIRELESS COMMUNICATION SYSTEM

CROSS REFERENCE TO RELATED APPLICATION

This application is a 35 U.S.C. § 371 national stage application of PCT International Application No. PCT/US2017/048545, filed on Aug. 25, 2017, the content of which is incorporated herein by reference in its entirety. The above-referenced PCT International Application was published in the English language as International Publication No. WO 2019/040077 A1 on Feb. 28, 2019.

FIELD

Various embodiments described herein relate to methods and devices in a wireless communication system and more particularly to communication based on identifying persons in a wireless communication system.

BACKGROUND

Millimeter wave technology plays an important role in modern wireless communication systems in order to achieve high communication throughput. However, the high frequencies used in millimeter wave technology are subject to interference and/or obstruction due to physical objects. Specifically, base stations operating at high frequencies may experience interference when communicating with user equipments (UEs) or intermittently lose communication with UEs. Solutions to improve communication in high frequency wireless communication systems will be discussed.

SUMMARY

Various embodiments described herein provide a method for communicating with a user equipment (UE) in a wireless communication system. The method includes detecting a person in a geographical area serviced by a base station, and communicating, by the base station, with the UE, responsive to detecting the person in the geographical area serviced by the base station. The UE is associated with the person in the geographical area serviced by the base station.

In some embodiments, detecting the person in the geographical area serviced by the base station may include performing image recognition to recognize the person located in the geographic area serviced by the base station.

The method may include scanning for a UE that is in an area in close proximity to the person that has been recognized by the image recognition, and associating the UE with the person. Associating the UE with the person includes establishing a connection for communication between the UE and the base station, and associating the connection for communication with the person. Scanning for the UE may include performing a beam sweep in the area in close proximity to the person that has been recognized. The beam sweep may be performed in a reduced set of beam angles corresponding to the area in close proximity to the person out of a full set of beam angles available for transmitting and/or receiving by the base station.

In some embodiments, scanning for the UE may include performing a beam sweep in the area in close proximity to the person that has been recognized at an increased frequency than a frequency of a conventional beam sweep of an area serviced by the base station. The method may include determining that the person does not have a registered UE associated with the person. Scanning for the UE may occur responsive to the determining that the person does not have a registered UE associated with the person.

In some embodiments, the base station is a first base station. The method may further include determining that the person is leaving the geographic area serviced by the first base station, and performing a handover to a second base station that is different from the first base station, in response to the determining that the person is leaving the geographic area serviced by the first base station. Determining that the person is leaving the geographic area serviced by the first base station may include performing image recognition to recognize the person located in the geographic area serviced by the base station, determining a direction of movement, angle of movement, and/or a speed of the person that was recognized, and extrapolating that the person is leaving the geographic area serviced by the first base station based on the image recognition and the determining the direction of movement, angle of movement and/or the speed of the person. Extrapolating that the person is leaving the geographic area may include predicting that the person is leaving the geographic area by applying machine learning based on data related to one or more other persons and their respective user equipments. Detecting the person in the geographical area serviced by the base station may include performing at least one of laser recognition, ultrasound imaging, radar imaging, or heat seeking recognition, to identify that the person is located in the geographic area serviced by the base station.

In some embodiments, the method may include identifying, subsequent to the communicating by the base station with the UE, that the person is no longer in the geographical area serviced by the base station. After identifying that the person is no longer in the geographical area serviced by the base station, a timeout period may be set. Based on an expiry of the timeout period, it may be selectively determined that the person has exited the geographical area serviced by the base station. Communication with the UE may be ceased, responsive to selectively determining that the person has exited the geographical area serviced by the base station. Based on a redetection of the person in the geographical area serviced by the base station before the expiry of the timeout period, it may be selectively determined that the person has not exited the geographical area serviced by the base station, such that the communicating with the UE continues.

In some embodiments, prior to the expiry of the timeout period, a beam sweep may be performed at an increased frequency than a frequency of a conventional beam sweep of the area serviced by the base station. Selectively determining that the person has not exited the geographical area serviced by the base station may include reducing the performing of the beam sweep to the frequency of the conventional beam sweep. Selectively determining that the person has exited the geographical area serviced by the base station may include determining if one or more other persons are in the geographical area serviced by the base station, and selectively placing the base station in a sleep mode, responsive to determining that no persons are in the geographical area serviced by the base station.

Communicating with the UE may include selecting an antenna configuration of the base station for communication with the UE, based on parameters discerned from the image recognition. The UE may be registered to the person in the geographical area serviced by the base station.

Various embodiments described herein can provide a wireless electronic device used in a wireless communication system. The wireless electronic device includes an antenna module that is configured to perform operations including detecting a person in a geographical area serviced by a base station that is associated with the antenna module, and communicating, by the antenna module, with the UE responsive to the detecting the person in the geographical area serviced by the base station. The UE may be associated with the person in the geographical area serviced by the base station.

In some embodiments, detecting the person in the geographical area serviced by the base station that is associated with the antenna module may include performing image recognition to recognize the person located in the geographic area serviced by the base station. In some embodiments, the antenna module may be further configured to perform operations including performing a beam sweep in the area in close proximity to the person that has been detected. The beam sweep may be performed in a reduced set of beam angles corresponding to the area in close proximity to the person out of a full set of beam angles available for transmitting and/or receiving by the antenna module.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

FIGS. 3 to 18 are flowcharts of operations for communicating with a user equipment in a wireless communication system, according to various embodiments described herein.

DETAILED DESCRIPTION

Figure 1:
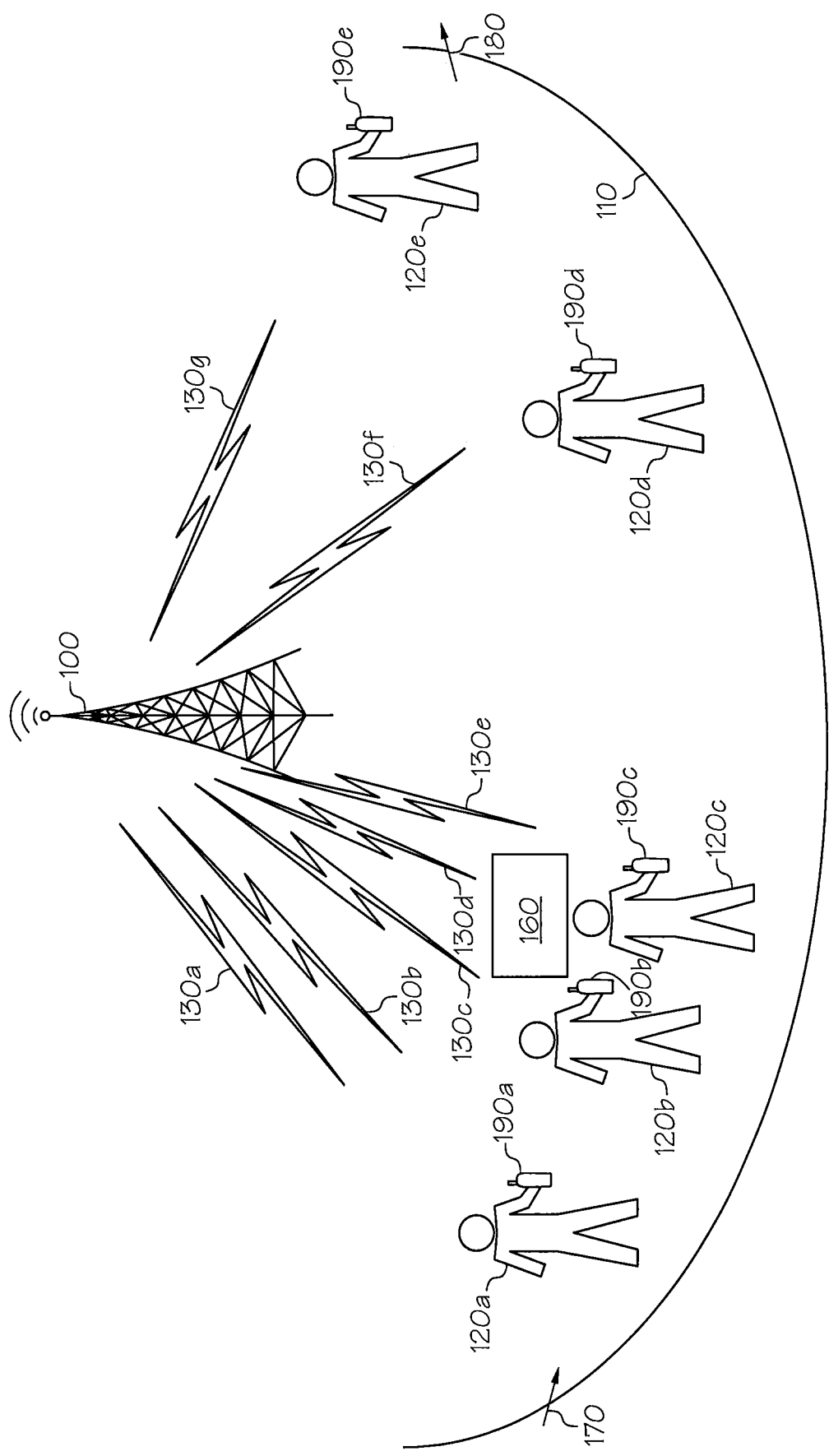
FIGS. 1 and 2 illustrate communication between a base station and user equipments associated with persons, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

Extremely high frequency (EHF) is the International Telecommunications Union (ITU) designation for the band of radio frequencies in the electromagnetic spectrum from 30 to 300 gigahertz (GHz). EHF lies between the super high frequency band and the far infrared band which may be also referred to as the terahertz gap. Radio waves in this band have wavelengths from ten to one millimeter, giving it the name millimeter band or millimeter wave, sometimes abbreviated as MMW or mmW. Modern communication systems such as 3GPP 5G systems include millimeter wave technology.

Millimeter waves may propagate by line-of-sight paths, and typically are not reflected by the ionosphere. Millimeter waves usually do not travel along the Earth as ground waves as lower frequency radio waves do. At typical power densities, millimeter waves may be blocked by building walls and suffer significant attenuation passing through landscape such as foliage. Absorption by atmospheric gases may be a significant factor in some portions of the millimeter band and this absorption may increase with frequency. However, significant absorption of millimeter ways may occur at a few specific absorption lines, mainly those of oxygen at 60 GHz and water vapor at 24 GHz and 184 GHz. At frequencies in the windows between these absorption peaks, millimeter waves have much less atmospheric attenuation and greater range, such that frequencies in these windows between absorption lines may be used in communication applications. For example, various implementations of 5G systems may use spectrum between 24 GHz and 44 GHz.

At these higher frequencies in 5G systems, signals may be obstructed and/or attenuated by physical objects to a higher degree than in conventional 3G and 4G communication systems. A shadowing effect may occur due to obstructions that provides difficulty for a base station to stay in continuous contact with a user equipment (UE). Time and resources may be spent by a communication system to predict where a UE is likely to be located, determine handovers, and/or when to consider the UE as permanently out of coverage.

Various embodiments described herein may arise from the recognition that improved methods are needed for better setup and maintenance of communication between a base station and a UE when employing millimeter wave technologies in 5G communication systems. Specifically, solutions to use image sensors with integrated image recognition of humans to improve setup and maintenance of communication when a UE experiences shadowing effects will be discussed in detail. Image sensors may detect humans in a communication environment and provide information that assists the base station in detecting, registering, and/or communicating with the UE.

Image sensors provide image recognition capability to recognize humans or persons in a geographical area served by the base station. Image sensors may be collocated with the base stations or may be strategically placed in or around a geographical area served by the base station. The image sensors may be implemented with integrated hardware and/or software as part of the base station, or as a separate device. Image sensors may include security cameras, wide-angle cameras, narrow-angle cameras, and/or stereoscopic cameras. The sensors may register when persons enter or leave the base station's coverage zone and may track position, direction of movement, speed, etc. of the person. A person likely has one or more UEs. As used herein the term "UE" includes an a radio communication device, target device, device to device (D2D) UE, machine type UE or UE capable of machine to machine communication (M2M), a sensor equipped with UE, tablet, mobile terminals, smart phone, laptop embedded equipped (LEE), laptop mounted equipment (LME), USB dongles, Customer Premises Equipment (CPE), etc. also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "base station" includes any fixed, portable and/or transportable device that is configured to communicate with one or more user equipment and/or with a core network, and includes, for example, nodes, terrestrial cellular base stations (including microcell, picocell, wireless access point and/or ad hoc communications access points) and satellites.

Recognition and/or information about the person may be used by the base station to determine if it should connect to a new UE that has entered the coverage zone, whether a UE should be considered as being permanently out of the base station's coverage zone if an associated person carrying the UE has left the coverage zone, or if a handover to another base station should be performed. Recognition of a person may cause the base station to increase beam sweep frequency in an area where a person has been detected since this area would likely be an area that a UE would located. Furthermore, the beam sweep frequency may be increased in an area close to where the person and/or UE were previously located but have disappeared and are likely to reappear due to shadowing effects. Increasing the frequency of beam sweeping based on the person being recognize has the effect of improving detection of UEs in the system by reducing the time/latency to providing a communication channel to the UE.

FIG. 1 illustrates a cell in a wireless communication system that includes a base station communicating with one or more UEs. Referring now to FIG. 1, base station 100 may be located in and service the geographical area in cell 110. Wireless communication between two devices such as a base station and a mobile device such as a UE involves data signals that are transmitted between the antennas of the UE and the base station. These signals may be directional and may be transmitted in beams that are aligned from one device to the other. Multiple beams may be available for transmitting signals between the base station and the UE. Beam sweeping may be conducted to evaluate various ones of the available directional beams for selection based on a variety of criteria.

Still referring to FIG. 1, the base station 100 may communicate with a user equipment 190. As used herein user equipment 190 may be used to refer to any of user equipments 190a through 190j of FIG. 1 and/or FIG. 2. Likewise, person 120 may be used to refer to any of the persons 120a through 120j of FIG. 1 and/or FIG. 2. User equipments 190a through 190e at various locations in the cell may use one or more beams 130a through 130g that are transmitted at respective beam angles from the base station 100. For example, a person 120a may be detected by the base station 100. Detection of the person may be accomplished using image recognition of the person in the geographic area serviced by the base station. Upon recognizing the person 120a, the base station may scan an area in close proximity to the person 120a that was recognized. Recognizing the person may include a general understanding that a human being is in the area and/or may entail recognizing a specific human being. The base station and/or associated network may have information regarding user equipment that are used by the specific human being. Scanning the area close to the person 120a is based on the premise, due to the ubiquitous presence of mobile devices, that a person likely has a UE or other mobile device in close proximity such as in their pocket, briefcase, handbag, or backpack, in their vehicle, or, in the case of being in a building, nearby on a desk or table. If the scanning of the proximity of the person yields identification of a UE 190a, the UE 190a is associated with the person 120a. Thus, detecting a person and then using the detection to search for the UE provides for faster registration and/or communication with the UE since the base station may look for a UE in the general vicinity of the person that was detected.

In some embodiments, upon recognition of a person, the base station may perform a beam sweep in the proximity of the person. The beam sweep may be limited to a subset of available beams. The proximity of the person may include a small area surrounding the person, such as in a 2 meter radius, or the room or vehicle in which the person is situated. For example, upon recognition of person 120a, base station 100 may scan the proximity of person 120a using beams 130a and/or 130b. Beams 130a and/or 130b have beam angles with respect to base station 100 that are in the area in the proximity of person 120a. The beams may include pilot beams or pilot signals.

In some embodiments, a physical barrier 160 that attenuates signals or shadows the user equipment 190c may be present in the environment. Physical barrier 160 may include landscape features such as foliage and buildings, atmospheric gases, water vapor, or physical objects such as desks, handbags, books, etc. A physical barrier 160 may provide a "shadow" that attenuates or blocks signals from base station 100 to UE 190b or UE 190c. In some cases, the person that is the user of the UE or other persons may be located between the base station 100 and the UE 190 and thus provide attenuation and/or blockage of signals. Thus persons may act as the physical barrier 160 of FIG. 1. The physical barrier 160 may prevent the base station from detecting and/or recognizing the person 120c that is behind the physical barrier 160. In these cases, the person 120c may have previously been recognized by the image sensor associated with the base station 100, but person 120c may have walked behind physical barrier 160. Therefore, person 120c may still be in the geographic area served by base station 100, and may reappear momentarily from behind the physical barrier 160. In this case, the base station 100 may identify that the person 120c is no longer visible in the geographic area served by the base station 100, and subsequently set a timeout period. In other words, the timeout period is a waiting period to ensure that the base station has not lost visibility of the UE for only a brief period of time, after which the UE is once again visible. If the timeout period expires, the base station 100 may conclude that the person 120c has exited the geographical area serviced by the base station 100. If the base station 100 concludes that the person 120c has exited the geographical area or cell 100, then base station 100 may cease communication with the UE 190c that is associated with person 120c. If the person 120c is redetected by base station 100 in the geographical area or cell 110 before expiry of the timer, then person 120c has not exited the geographical area/cell 110 serviced by the base station 100. In this case the base station 100 may continue communicating with UE 190c.

Still referring to FIG. 1, physical barrier 160 may provide a "shadow" that attenuates or blocks signals from base station 100 to UE 190b but does not impede recognition of person 120b that is associated with UE 190b. In this case, base station 100 may lose communication with UE 190b, but may still recognize that person 120b is within cell 110 which is serviced by base station 100. Base station 100 may assume that person 120b still has the UE associated with them and/or may assume that previously associated UE 190b is still in close proximity to person 120b. The base station may keep a previous connection to UE 190b alive, and/or set a time out period within which base station 100 expects UE 190 be to reappear. In this case, since the base station 100 is reasonably sure that 190b is still within cell 110, base station 100 may increase the frequency of sweeping of the beams 130a through 130g in search of UE 190b. In some embodiments, the base station 100 may perform a beam sweep in a reduced set of beam angles with beams 130*c* through 130*e*, which are in close proximity to person 120*b*. The reduced set of beam angles may be a subset of the full set of beam angles available for transmitting and/or receiving by base station 100.

Still referring to FIG. 1, in some embodiments, base station 100 may recognize a person 120*a* that is at an edge of the cell 110 and/or may recognize that person 120*a* recently arrived on a path 170 from an adjacent cell or adjacent geographical area. If person 120*a* is detected as being newly arriving in cell 110, the base station 100 may scan the general vicinity of person 120*a* with the likely notion that person 120*a* is bringing a UE or other mobile device into the cell. In this manner, base station 100 may register UE 190*a* and begin communication with UE 190*a* faster than when using conventional methods. Registering a UE may include adding to and/or modifying the base station list of UEs currently within the base station's communication range.

In some embodiments, the base station 100 may recognize that person 120*e* is near a boundary of cell 110 and is likely traveling path 180, leading to a location outside the cell 110. The base station may respond by performing a handover to another base station, increasing power to the UE, or by changing the frequency of beam sweeping.

Figure 2:
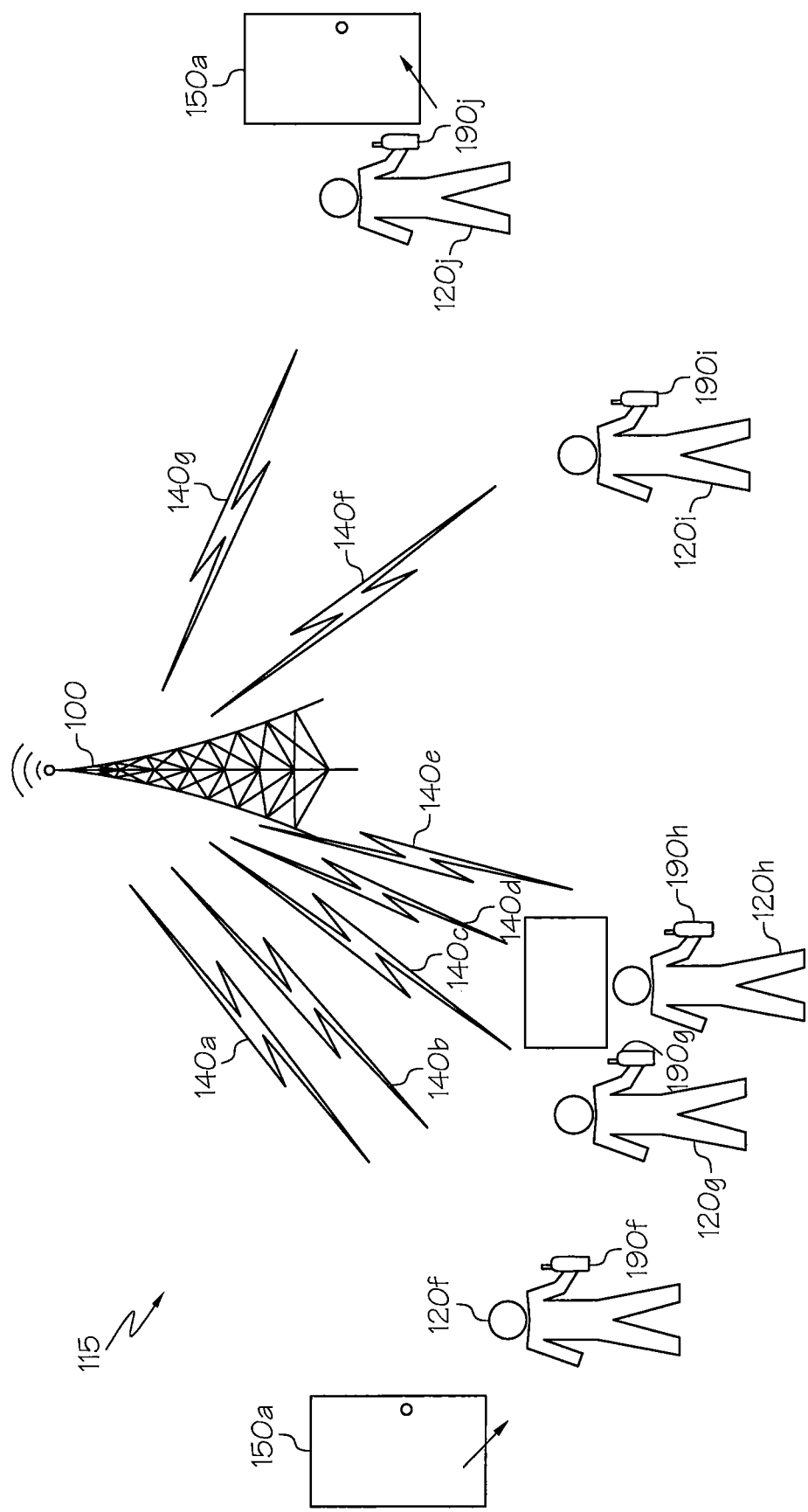

FIG. 2 illustrates a cell in a wireless communication system that includes a base station communicating with one or more UEs. FIG. 2 is similar to FIG. 1 but the base station may be in a room, building, or other location, instead of in cell 110 in a cellular network, as discussed with respect to FIG. 1. Embodiments and/or concepts described related to FIG. 1 generally apply to those of FIG. 2. Referring now to FIG. 2, a room 115 or other area of a building that is serviced by base station 100 is illustrated. The room may include doors 150*a* and 150*b* that a person may use to enter or exit the room. Base station 100 may make scanning decisions based on the understanding that the doors 150*a* and/or 150*b* are used by persons 120*f* though 120 *j* to enter or leave the room 115. Specifically, if person 120*f* is newly detected by base station 100, it may conduct a beam sweep in the vicinity of person 120*f* to register a UE that is likely associated with the person 120*f*. Similarly, if a person 120*j* has a previously registered UE 190*j* associated with them, detection by the base station of the person 120*j* near the door 150*b* may indicate that the person 120*j* is leaving the area served by base station 100. The base station may respond by performing a handover to another base station. Thus, the base station may use detection and/or recognition of a person in order to make more informed handover decisions based the anticipated behavior of the person.

Figure 3:
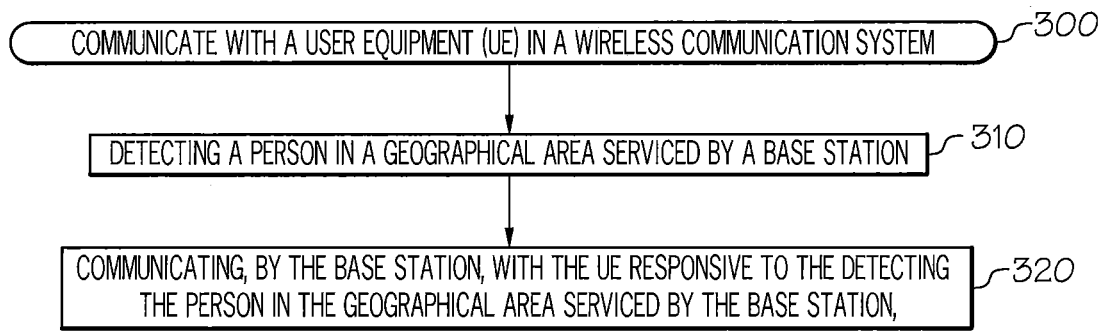

FIGS. 3 to 18 are flowcharts of operations by the base station 100 of FIG. 1 and/or FIG. 2 for communicating with a user equipment 190 in a wireless communication system. Referring now to FIG. 3, the base station 100 of FIG. 1 and/or FIG. 2 may want to communicate with any of UEs 190*a* through 190*j* of FIG. 1 and/or FIG. 2, at block 300. A person may be detected in the geographical area serviced by the base station, at block 310. The base station may communicate with the UE, responsive to detecting the person in the geographical area serviced by the base station, at block 320. The UE may be associated with the person in the geographical area serviced by the base station. In some embodiments, the UE may be registered to the person. In other words, it is likely that the same UE is associated with the same person for a long period of time. This information may be used by the base station to improve the speed at which the base station is able to set up and communicate with the UE since detection of a specific person may indicate the presence of a specific UE in the geographical area serviced by the base station. Registration of the UE to the person may include setting up a communication channel between the base station and the UE. The base station may have registration information stored locally in memory or may receive information from a network provider that indicates that the UE is registered to the person. Some embodiments include detecting a person in a geographical area serviced by a base station, and communicating between the base station and the UE, in a way that is responsive to that detection.

Figure 4:
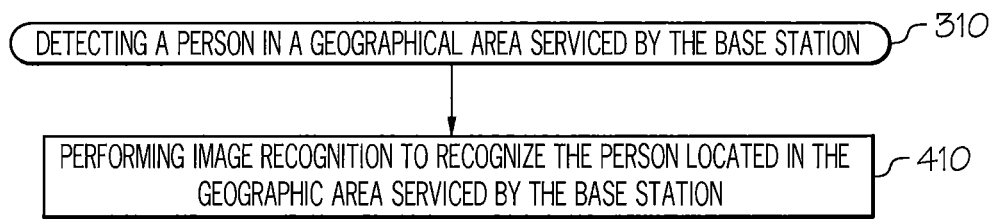

Referring now to FIG. 4, detecting the person in the geographical area serviced by the base station, at block 310, may include performing image recognition to recognize the person located in the geographic area serviced by the base station, at block 410. Recognizing the person in the geographical area may include a general detection that a human being is in the area and/or may entail recognizing a specific human being. Image recognition may encompass having a digital camera capture images used in the image recognition process. In some embodiments, image recognition may include performing laser recognition, ultrasound imaging, radar imaging, and/or heat seeking recognition, to identify that the person is located in the geographic area serviced by the bay station. Image recognition may also include facial recognition to identify the existence of a human or to identify a specific human based on facial structure.

Figure 5:
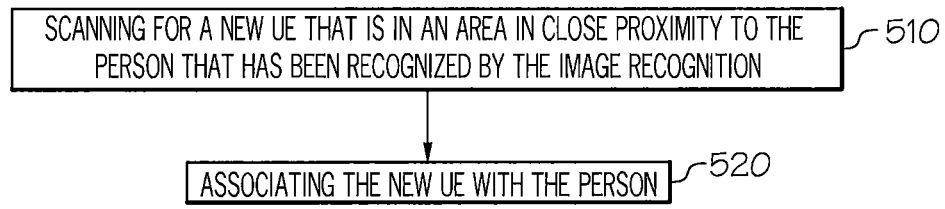

Referring now to FIG. 5, communicating with a UE may include scanning for a UE that is in an area in close proximity to the person that has been recognized by the image recognition, at block 510. In some embodiments the UE that is detected by scanning may be associated with the person, at block 520. Associating the UE with the person may include UE registration, connection set up, and/or a network attachment procedure.

Figure 6:
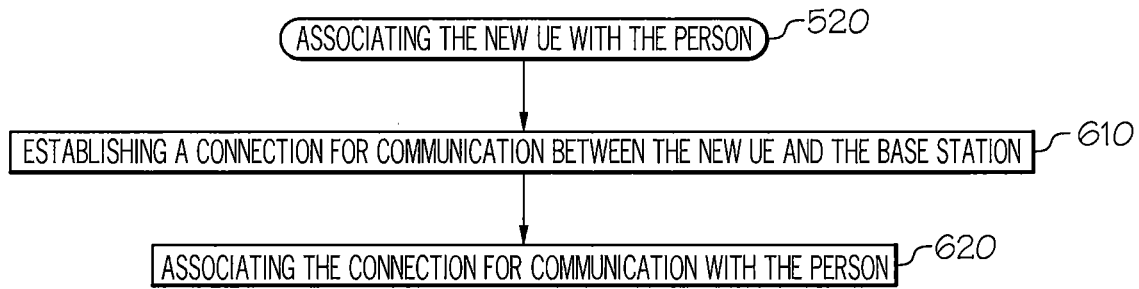

Referring now to FIG. 6, associating the UE with the person at block 520 may include establishing a connection for communication between the UE and the base station, at block 610. The connection that is established may be associated with the person, at block 620. The connection may include establishing a link using 4G/LTE/5G protocols or the like. In this way, the base station specifically identifies one or more UEs that are associated with the person that was identified. Identifying the UE may include the base station accessing a database that include information about the UE such as IMIE, MAC address, etc. that are routinely associated with and/or used by the person. The base station specifically associates one or more UEs with the person that was identified.

Figure 7:
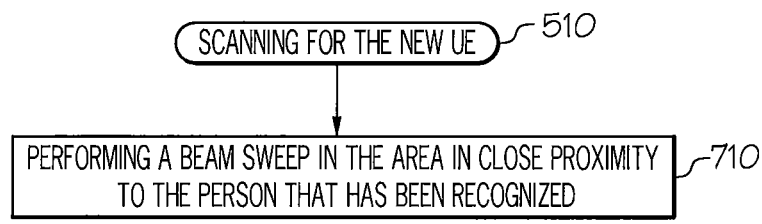

Referring now to FIG. 7, scanning for the UE at block 510 may include performing a beam sweep in the area in close proximity to the person that has been recognized, at block 710. The beam sweep in the close proximity to the person may include a subset of beams whose angle corresponds to the proximity of the location of the person that was recognized.

Figure 8:
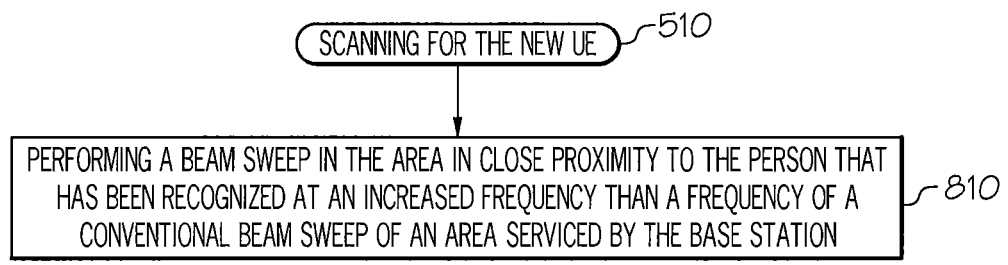

Referring now to FIG. 8, scanning for the UE at block 510 of FIG. 5 may include performing a beam sweep in the area in close proximity to the person that has been recognized at an increased frequency than at a frequency of a conventional beam sweep of the area serviced by the base station, at block 810. In other words the beam sweep may be performed more often when it is likely that a UE is in the vicinity of a person. In some embodiments the beam sweep maybe performed in a reduced set of been angles corresponding to the area in close proximity to the person out of a full set of beam angles available for transmitting and/or receiving by the base station. In other words, instead of sweeping the entire coverage area of the base station, the area in close proximity to the person that was recognized is swept. This reduced beam sweep has the effect to improve efficiency since power is saved by not sweeping the entire coverage area and also may reduce latency of establishing the connection since a smaller coverage area is swept.

Referring now to FIG. 9, once a person is recognized, it may be determined that the person does not have a registered UE associated with the person, at block 910. In some embodiments, scanning for the UE may occur responsive to determining that the person does not have a registered UE associated with them.

Referring now to FIG. 10, the wireless communication system may include the first base station and a second base station in a neighboring cell, room, building, or other neighboring location. It may be determined that the person who was recognized is leaving the geographic area serviced by the first base station, at block 1010. In this case, a handover may be performed to a second neighboring base station that is different from the first base station, at block 1020. This handover me occur in response to determining that the person is leaving the geographic area serviced by the first base station.

Referring now to FIG. 11, determining that the person is leaving the geographic area serviced by the first base station of block 1010 of FIG. 10 may include performing image recognition to recognize the person is in the geographic area serviced by the base station, at block 1110. The base station may determine the direction of movement, angle of movement, and/or a speed of the person that was recognized, at block 1120. Based on the determination at block 1120, the base station may extrapolate that the person is leaving the geographic area serviced by the first base station, at block 1130.

Figure 12:
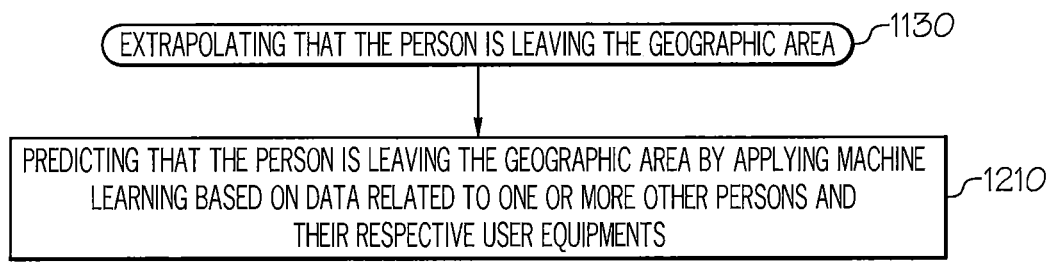

Referring now to FIG. 12, extrapolating that the person is leaving the geographic area at block 1130 of FIG. 11 may include predicting that the person is leaving the geographic area by applying machine learning based on data related to one or more other persons and their respective devices, at block 1210. In some embodiments, such as illustrated in FIG. 1, the person may be traveling path 180, leading to a location outside the cell 110. The base station may use machine learning to predict that the UE associated with the person is headed for a geographical area outside of the coverage zone of the base station. Machine learning is an application of artificial intelligence (AI) that provides systems the ability to automatically learn and improve from experience without being explicitly programmed. Machine learning focuses on the development of computer programs that can access data and use it learn for themselves. The base station may use data from previous persons and/or UEs that were at a similar location near the edge of the cell, travelling at a similar speed, or in a similar direction to predict that the user and/or the UE are leaving the cell. In this case, the base station may preemptively perform a handover to a neighboring cell such that the communication quality does not diminish when moving to another cell.

In some embodiments, the base station may learn that certain points in the cell or in the building cause the person and/or UE to disappear for long periods of time. For these locations, the base station, based on learned experiences, may preventively handover to another base station. For example, a park bench within the cell may be surrounded by trees that block the image sensor of the base station from recognizing a person that is sitting on the bench and/or block communication signals from reaching the bench area. If the base station loses sight of a person that was walking towards the bench, the base station may perform a handover to another base station with the expectation that this person and/or UE will stay in the park bench location for a longer period of time, based on prior persons' and/or UEs' behavior.

Figure 13:
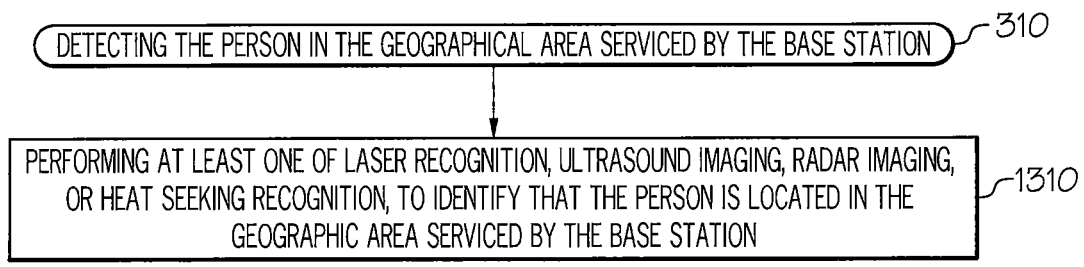

Referring now to FIG. 13, detecting the person in the geographical area serviced by the base station of block 310 of FIG. 3 may include performing at least one of laser recognition, ultrasound imaging, radar imaging, and/or heat seeking recognition, to identify that the person is located in the geographic area serviced by the base station, at block 1310. An image may be captured that is subsequently used to perform an image recognition procedure to find a person in the image. Although a non-exhaustive list of image recognition techniques are described, other techniques for facial recognition, person authentication, etc. may be applied in the spirit of the described inventive concepts.

Figures 14, 15:
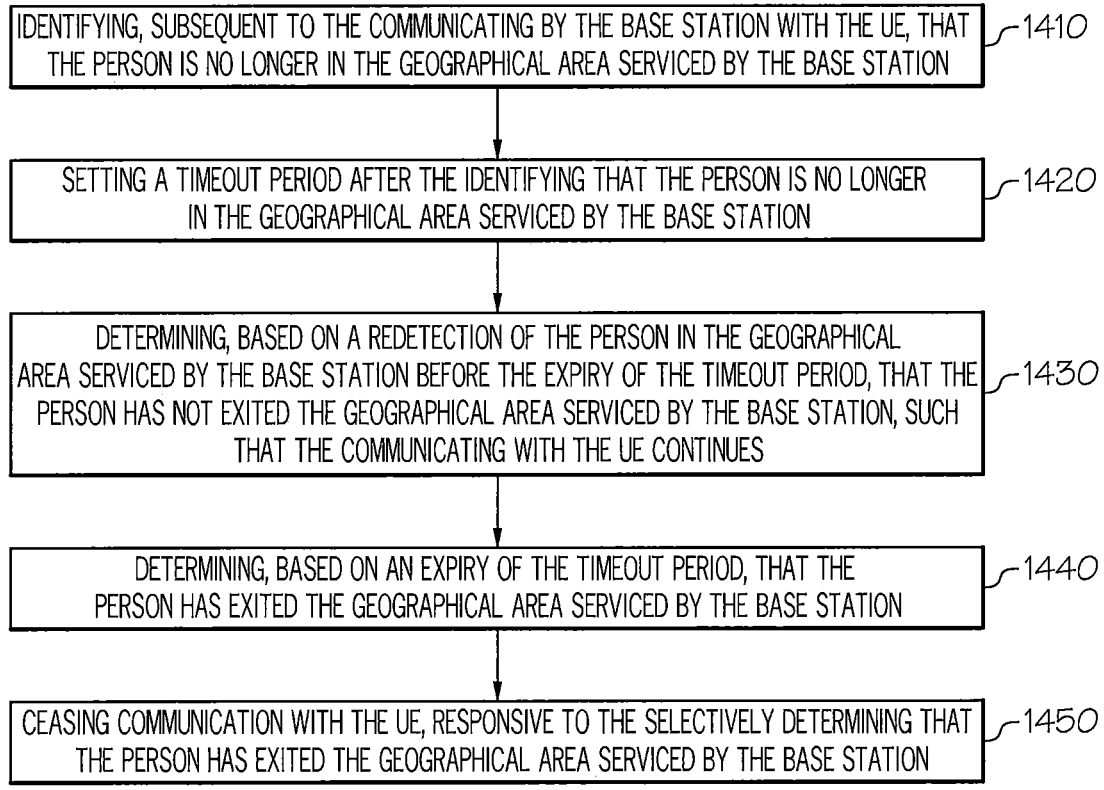

When a base station is in communication with a UE after detecting the person, it may be possible for the base station to lose sight of the person and/or lose communication with the UE. Referring now to FIG. 14, subsequent to communication between the base station and the UE, the base station may identify that the person is no longer in the geographical area serviced by the base station, at block 1410. The base station may have previously recognized the person in its service area, but subsequently the person may no longer be present in the service area. The base station may set a time out after identifying that the person is no longer in the geographical area serviced by the base station, at block 1420. In some embodiments, the base station may redetect or subsequently recognize the person in the geographical area before expiry of the time out period. If this occurs, the base station may determine that the person has not exited the geographical area serviced by the base station, at block 1430, and may continue communicating with the UE using a previously established connection. Based on an expiry of the time out, the base station may determine that the person has exited the geographical area serviced by the base station, at block 1440. In this case, the base station, upon determining that the person has exited the geographical area serviced by the base station, may cease communication with the UE, at block 1450.

Referring now to FIG. 15, prior to the expiry of the timeout period, the base station may perform a beam sweep of the geographical area at an increased frequency than the frequency of a conventional beam sweep, at block 1510. This beam sweep may occur over a substantive portion of the range covered by the base station or may be over a reduced set of beam angles that are near the previously known location of the person and/or the UE.

Figure 16:
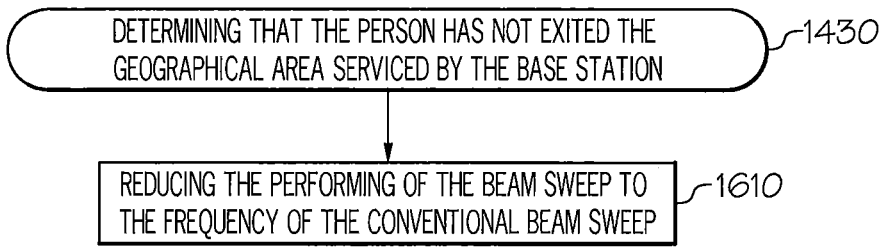

Referring now to FIG. 16, determining that the person has not exited the geographical area serviced by the base station, at block 1430 of FIG. 14, may include reducing the performing of the beam sweep to the frequency of the conventional beam sweep, at block 1610. In other words, upon recognizing that the person and/or the UE are still in the base station coverage zone, conventional beam sweeping may continue to maintain communication with the UE.

Figure 17:
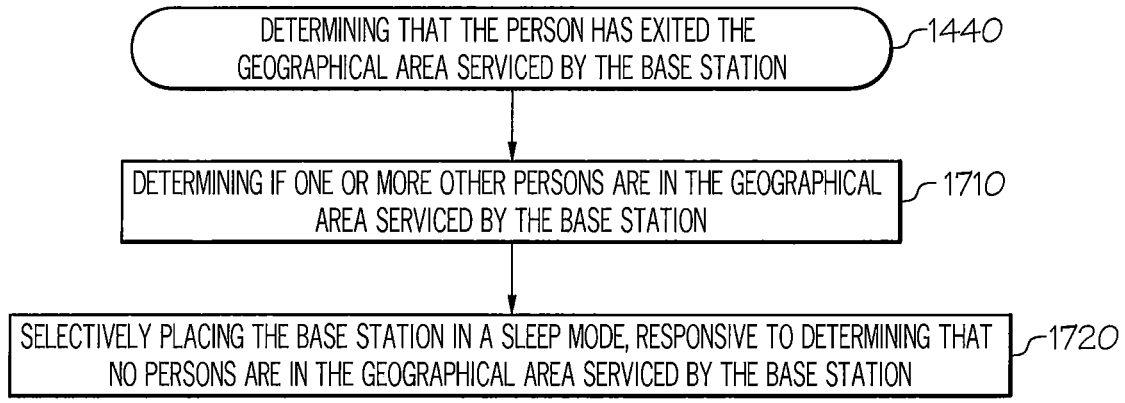

Referring now to FIG. 17, determining that the person has exited the geographical area of block 1440 of FIG. 14 may include determining if one or more other persons are in the geographical area serviced by the base station, at block 1710. If no persons are in its geographical area, then the base station likely has no UEs to service, such that the base station may be selectively placed in a sleep mode, at block 1720. This sleep mode saves power at the transmitter and/or receiver of the base station since beam sweeps may not be performed. The base station may wake up and continue operation upon detection of a person in the geographical area serviced by the base station. The base station may be immediately placed in sleep mode when detecting no persons in the geographical area. In some embodiments, the base station may be placed in sleep mode after waiting a period of time.

Figure 18:
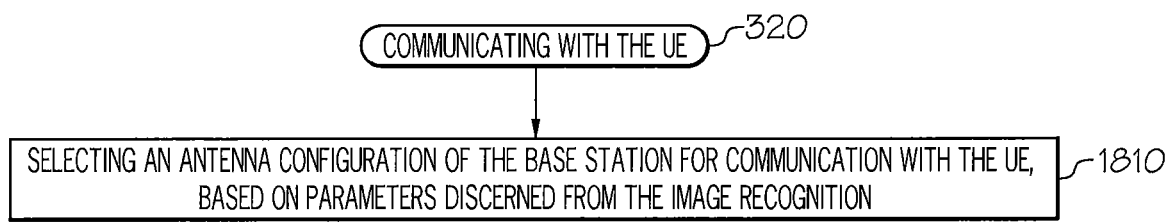

Referring now to FIG. 18, communicating with the UE as in block 320 of FIG. 3 may include selecting an antenna configuration of the base station for communicating with the UE based on parameters discern from the image recognition, at block 1810. The image recognition may include facial recognition or body positioning recognition of the person. Parameters such as distance from the base station and angle of communication for the location of the person may be measured, calculated, or otherwise determined. Detailed image recognition that includes location of the persons face and/or body positioning may provide input to the antenna selection process. For example, the number of MIMO antennas may be reduced if it is recognized that the person is sitting down in a room and less likely to be in motion. As such, there is less likelihood of fading and intersymbol interference such that a smaller number of MIMO antennas may be used. It may be determined by the image recognition whether the person is in motion. If the person is determined to be in motion, a wider angle of beams may be necessary and/or a greater number of antennas or greater transmit/receive power may be necessary. These techniques improve the power efficiency and/or the spectral efficiency of the communication system.

Figure 19:
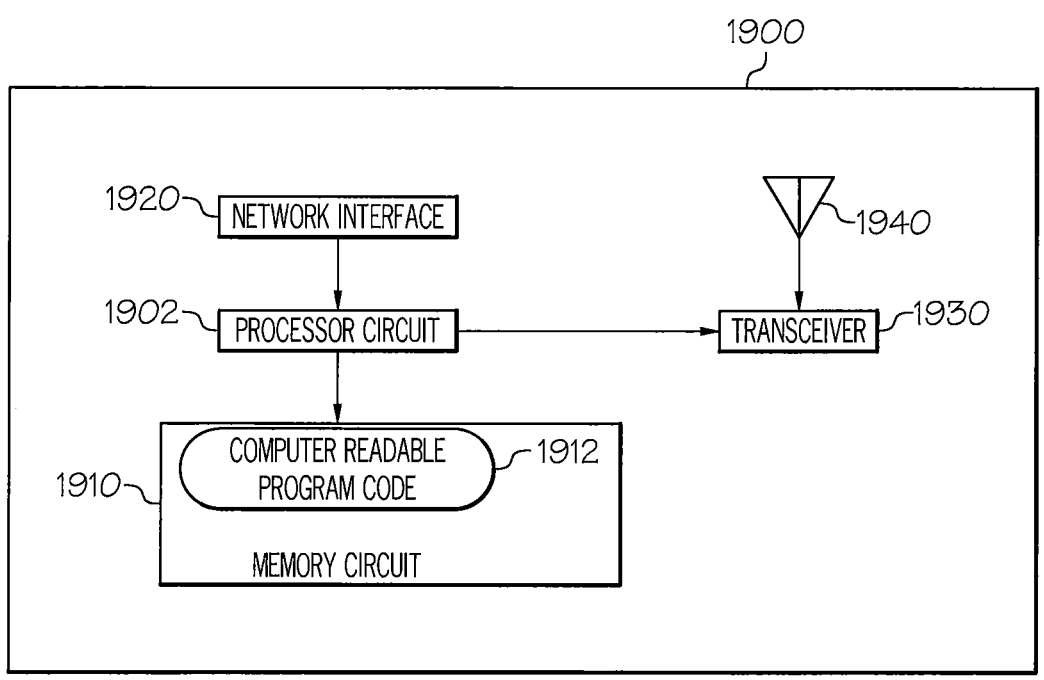
FIGS. 19 and 20 are block diagrams of wireless electronic devices, according to various embodiments described herein.

FIG. 19 is a block diagram of a wireless electronic device 1900. The wireless electronic device may be associated with the base station 100 of FIG. 1 or FIG. 2, in a wireless communication system. The wireless electronic device may be separate from base station 100, co-located with base station 100, or may be integrated with base station 100. The wireless electronic device 1900 may include an antenna module that is configured to perform operations according to one or more embodiments disclosed herein. Referring to FIG. 19, the wireless electronic device 1900 includes a radio transceiver circuit 1930, a processor circuit 1902, and a memory circuit 1910 containing computer readable program code 1912. The processor circuit 1902 may include one or more data processing circuits, such as a general purpose and/or special purpose processor, e.g., microprocessor and/or digital signal processor, that may be collocated or distributed across one or more networks. The processor circuit 1902 is configured to execute the computer readable program code 1912 in the memory 1910 to perform at least some of the operations and methods of described herein as being performed by the wireless electronic device 1900. Antenna hardware 1940 may be used for signal propagation. The network interface 1920 is coupled to the processor circuit 1902 and communicates with UEs 190a through 190j of FIG. 1 or FIG. 2, directly or indirectly.

Figure 20:
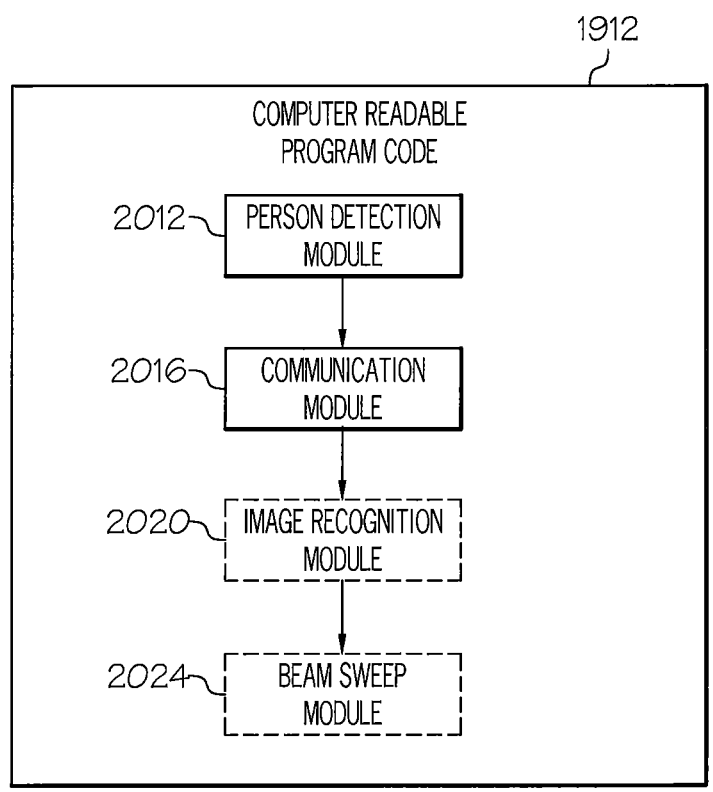

FIG. 20 illustrates modules for an antenna module that perform operations as disclosed herein according to some embodiments. The modules include a person detection module 2012, a communication module 2016, an image recognition module 2020, and/or a beam sweep module 2024. The person detection 2012 is for performing person detection (block 310 of FIG. 3). The communication module 2016 is for communicating with a UE (block 320 of FIG. 3). The image recognition module 2020 is for performing image recognition of persons in the geographical area serviced by the base station. The beam sweep module 2024 is for controlling the beams used and the frequency of sweeping of beams in scanning for UEs. The modules 2012, 2016, 2020, and 2024 perform other corresponding operations and methods disclosed herein.

Various embodiments presented herein have described improved methods for wireless communication between a base station and a UE. Specifically, a person may be detected in an area serviced by a base station to improve communication and reduce latency of connecting a UE to a base station. This may be achieved using image recognition of persons and using image recognition for more intelligent selection of beams for wireless communication. The techniques described herein can reduce signaling overhead and/or reduce latency of data connection setup between devices. Although the embodiments described herein have been in the context of 5G systems, these techniques may be applied to other legacy communication systems such 3G and 4G communication systems as well as other high frequency communication technologies.

Further Definitions

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A wireless electronic device used in a wireless communication system, the wireless electronic device configured to perform operations comprising:
    detecting a person in a geographical area serviced by a base station by performing image recognition to recognize the person located in the geographic area serviced by the base station;
    scanning for a user equipment (UE) that is in an area in close proximity to the person that has been recognized by the image recognition;
    associating the UE with the person in the geographical area serviced by the base station; and
    communicating with the UE, responsive to the detecting the person in the geographical area serviced by the base station.

2. The wireless electronic device of claim 1, wherein the associating the UE with the person comprises:
    establishing a connection for communication between the UE and the base station; and
    associating the connection for communication with the person.

3. The wireless electronic device of claim 1, wherein the scanning for the UE comprises:
    performing a beam sweep in the area in close proximity to the person that has been recognized,
    wherein the beam sweep is performed in a reduced set of beam angles corresponding to the area in close proximity to the person out of a full set of beam angles available for transmitting and/or receiving by the base station.

4. The wireless electronic device of claim 1, wherein the scanning for the UE comprises:
    performing a beam sweep in the area in close proximity to the person that has been recognized at an increased frequency than a frequency of a conventional beam sweep of an area serviced by the base station.

5. The wireless electronic device of claim 1, wherein the wireless electronic device is configured to perform operations further comprising:
    determining that the person does not have a registered UE associated with the person,
    wherein the scanning for the UE occurs responsive to the determining that the person does not have the registered UE associated with the person.

6. The wireless electronic device of claim 1, wherein the base station comprises a first base station, wherein the wireless electronic device is configured to perform operations further comprising:
    determining that the person is leaving the geographic area serviced by the first base station; and
    performing a handover to a second base station that is different from the first base station, in response to the determining that the person is leaving the geographic area serviced by the first base station.

7. The wireless electronic device of claim 6, wherein the determining that the person is leaving the geographic area serviced by the first base station comprises:
    performing image recognition to recognize the person located in the geographic area serviced by the base station;
    determining a direction of movement, angle of movement, and/or a speed of the person that was recognized; and
    extrapolating that the person is leaving the geographic area serviced by the first base station based on the image recognition and the determining the direction of movement, angle of movement and/or the speed of the person.

8. The wireless electronic device of claim 7, wherein the extrapolating that the person is leaving the geographic area comprises:
    predicting that the person is leaving the geographic area by applying machine learning based on data related to one or more other persons and their respective user equipments.

9. The wireless electronic device of claim 1, wherein the detecting the person in the geographical area serviced by the base station comprises:
    performing at least one of laser recognition, ultrasound imaging, radar imaging, or heat seeking recognition, to identify that the person is located in the geographic area serviced by the base station.

10. A wireless electronic device used in a wireless communication system, wherein the wireless electronic device is configured to perform operations comprising:
    detecting a person in a geographical area serviced by a base station;
    communicating with a user equipment, UE, responsive to the detecting the person in the geographical area serviced by the base station, wherein the UE is associated with the person in the geographical area serviced by the base station;
    identifying, subsequent to the communicating by the base station with the UE, that the person is no longer in the geographical area serviced by the base station;
    setting a timeout period after the identifying that the person is no longer in the geographical area serviced by the base station;
    determining, based on a redetection of the person in the geographical area serviced by the base station before expiry of the timeout period, that the person has not exited the geographical area serviced by the base station, such that the communicating with the UE continues;
    determining, based on the expiry of the timeout period, that the person has exited the geographical area serviced by the base station; and
    ceasing communication with the UE, responsive to the determining that the person has exited the geographical area serviced by the base station.

11. The wireless electronic device of claim 10, wherein the wireless electronic device is configured to perform operations further comprising:
    prior to the expiry of the timeout period, performing a beam sweep at an increased frequency than a frequency of a conventional beam sweep of the geographical area serviced by the base station.

12. The wireless electronic device of claim 11, wherein the determining that the person has not exited the geographical area serviced by the base station comprises:
    reducing the performing of the beam sweep to the frequency of the conventional beam sweep.

13. The wireless electronic device of claim 10, wherein the determining that the person has exited the geographical area serviced by the base station comprises:

determining if one or more other persons are in the geographical area serviced by the base station; and selectively placing the base station in a sleep mode, responsive to determining that no persons are in the geographical area serviced by the base station.

14. The wireless electronic device of claim 1, wherein the communicating with the UE comprises:

selecting an antenna configuration of the base station for communication with the UE, based on parameters discerned from the image recognition.

15. The wireless electronic device of claim 1, wherein the UE is registered to the person in the geographical area serviced by the base station.

16. A method for communicating with a user equipment, UE, in a wireless communication system, the method comprising:

detecting a person in a geographical area serviced by a base station that is associated with an antenna module;

communicating with the UE responsive to the detecting the person in the geographical area serviced by the base station; and performing a beam sweep in the geographical area in close proximity to the person that has been detected, wherein the UE is associated with the person in the geographical area serviced by the base station, and wherein the beam sweep is performed in a reduced set of beam angles corresponding to the geographical area in close proximity to the person out of a full set of beam angles available for transmitting and/or receiving by the UE.

17. The method of claim 16, wherein the detecting the person in the geographical area serviced by the base station comprises:

performing image recognition to recognize the person located in the geographic area serviced by the base station.

* * * * *